Aug. 18, 1931.  J. E. THORNTON  1,819,047
CINEMATOGRAPH APPARATUS
Filed Jan. 6, 1927  3 Sheets-Sheet 1
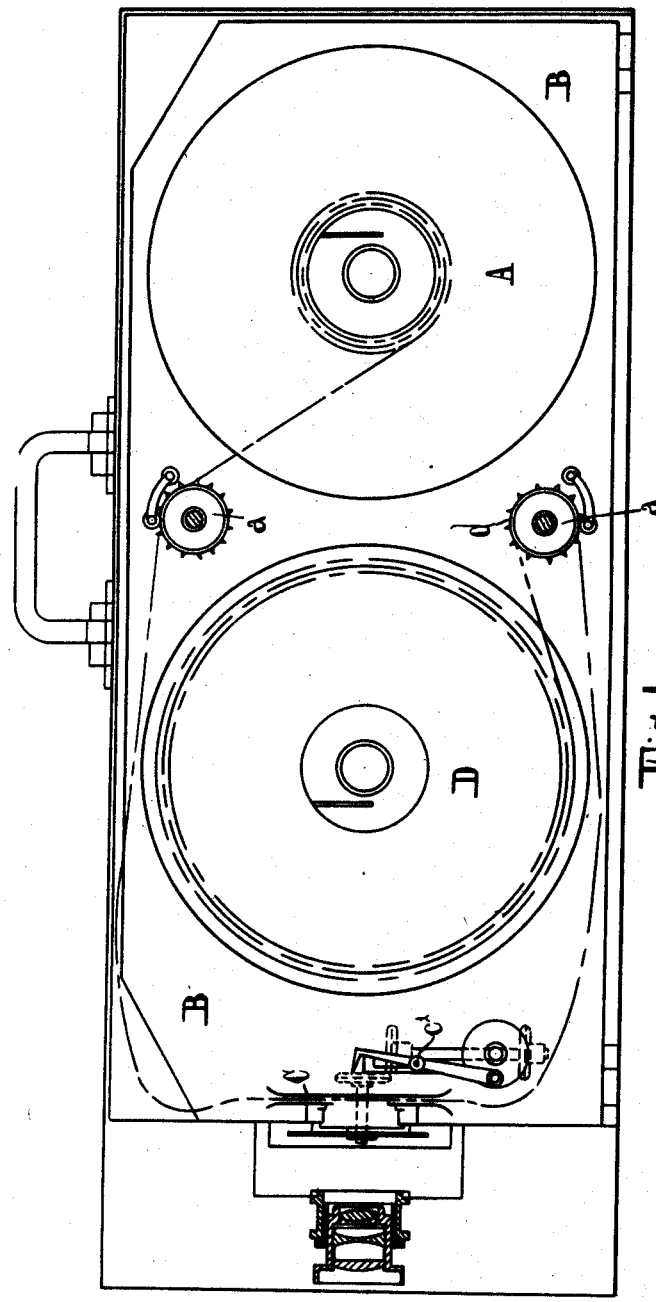
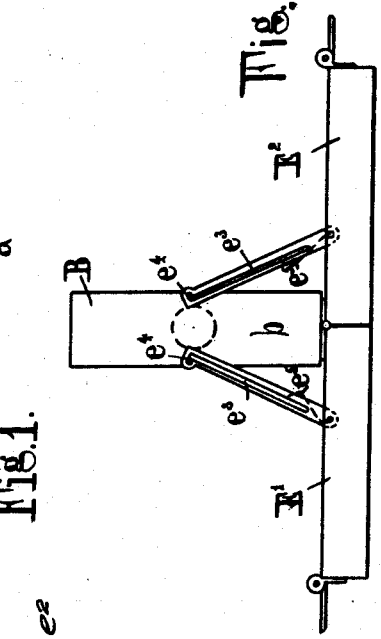
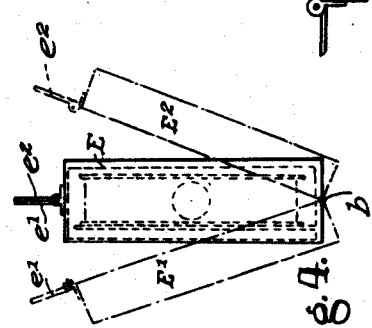
INVENTOR.

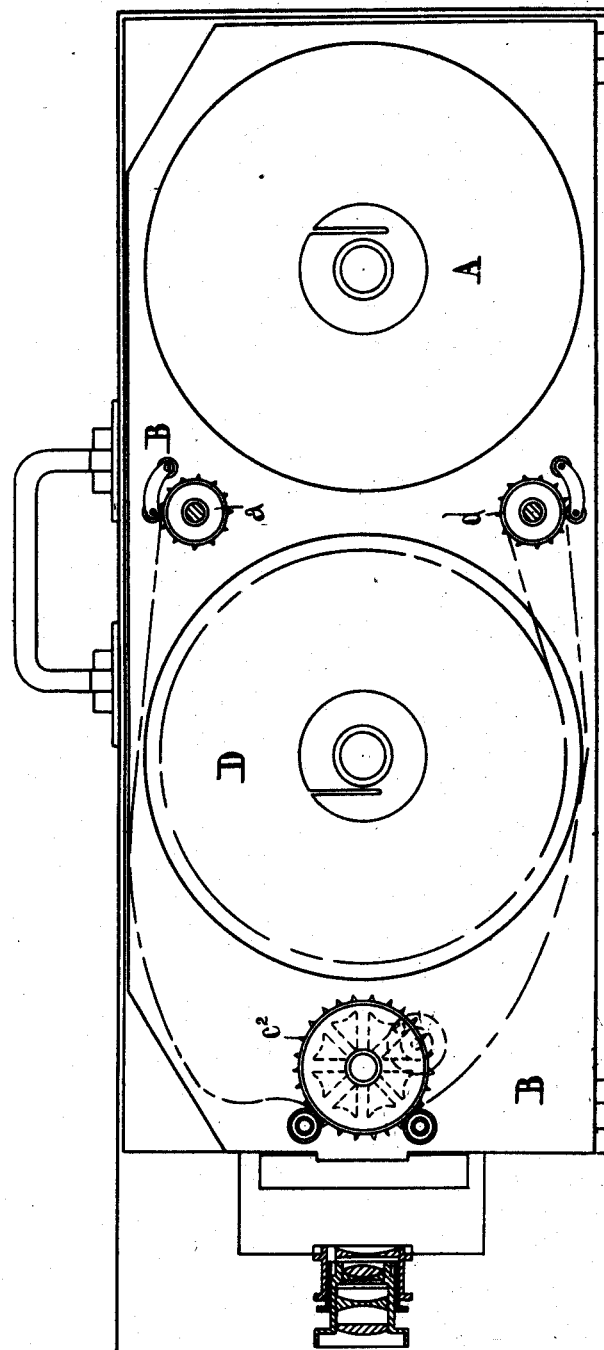

Aug. 18, 1931.  J. E. THORNTON  1,819,047
CINEMATOGRAPH APPARATUS
Filed Jan. 6, 1927  3 Sheets—Sheet 3

INVENTOR
J. E. Thornton

Patented Aug. 18, 1931

1,819,047

UNITED STATES PATENT OFFICE

JOHN EDWARD THORNTON, OF WEST HAMPSTEAD, LONDON, ENGLAND, ASSIGNOR TO JOHN OWDEN O'BRIEN, OF MANCHESTER, ENGLAND

CINEMATOGRAPH APPARATUS

Application filed January 6, 1927, Serial No. 159,479, and in Great Britain January 6, 1926.

This invention relates to the disposition of the delivery spool and receiving reel in relation to the other mechanism of a cinematograph camera, projector, or printing apparatus, and to an arrangement of carrying case for enclosing same, and is more particularly intended for small portable apparatus of the type used by amateurs and travellers, being designed to produce a long but narrow package suitable for carrying in the hand.

In the present invention the delivery spool is placed at the back end of a case or frame, the gate or other exposing device is placed at the front end, and the receiving reel is placed in the centre between delivery spool and gate.

The invention will be described with reference to the accompanying drawings.

Fig. 1 shows the invention applied to a camera having a claw feed and spring gate.

Fig. 2 shows the invention applied to a camera having a sprocket driven feed without gate.

Fig. 4 is a front view of the carrying case for the camera such as shown in Fig. 1 or Fig. 2 in the closed position.

Fig. 5 is a similar view with the two sides of the case opened to form a large flat base for the camera.

Figure 3:
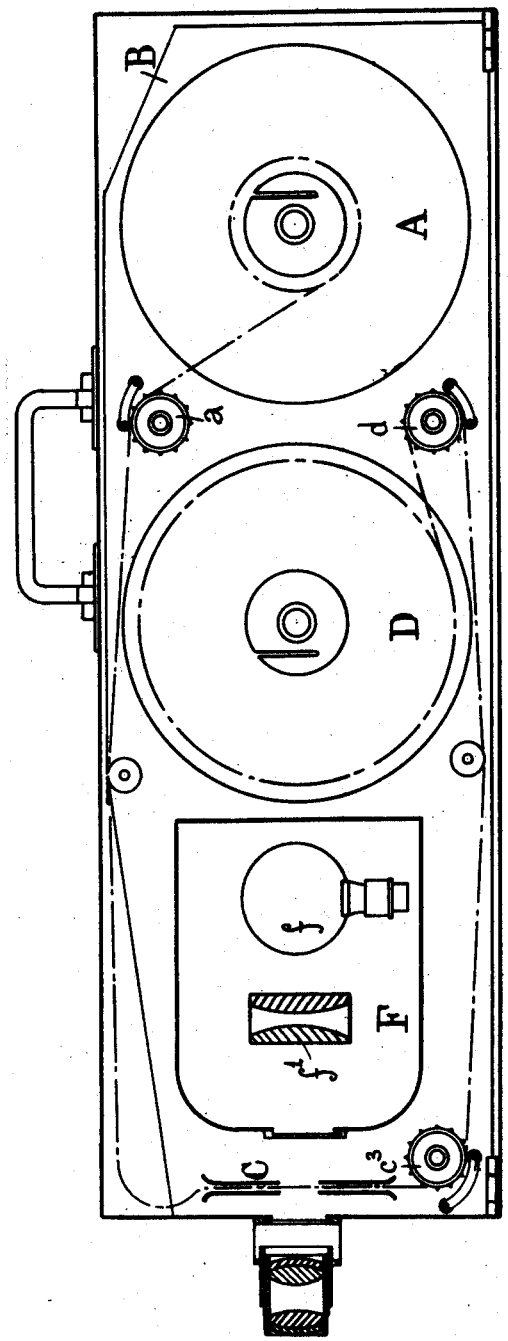
Fig. 3 shows the invention applied to a portable projector having a sprocket feed and spring gate.

As applied to a camera, as shown in Figs. 1 and 2, or to a projector, as shown in Fig. 3, the delivery spool A is placed at the rear of a case or frame B. The gate C or other exposing mechanism is placed at the front end of the frame and the receiving spool D is placed in the centre between the delivery spool A and the gate C.

The intermittent feed for traversing the film may be of any suitable known type, for example a claw motion $c^1$ as shown in Fig. 1, a sprocket motion $c^2$ and spring gate C as shown in Fig. 3, or a hollow sprocket drum $c^3$ without a gate as shown in Fig. 2.

The usual continuously running feed sprocket $d$ is arranged in the film track between the exposing mechanism and the receiving spool D and also a sprocket $a$ is arranged in the film track between the delivering spool A and the exposing mechanism.

The various parts are mounted on any suitable form of frame B usual in cinematograph apparatus.

In a projector as shown in Fig. 3 the lamp $f$ and condenser $f^2$ are arranged in an aperture or opening F passing through the entire body of the projector.

By the above described dispositions of the delivery spool A and receiving reel D several advantages are obtained; for example, the film track is in a straight line, and twisting of the film at an angle in a different plane during its travel, and all guides necessary for effecting such twist, are avoided; the spool or reel to which most frequent access is desired is placed at the back; the gate and film operating mechanism being at the front, there is nothing to impede its free working; and finally the disposition enables the mechanism to form a very narrow and compact but elongated shape capable of being enclosed by a case which forms a very convenient passage for carrying by a handle.

The arrangement of the delivery spool A and receiving reel D permits of a very strong and simple type of carrying case being combined with the camera or projector.

In the form of carrying case E shown in Figs. 4 and 5, the case is divided longitudinally into two parts $E^1$, $E^2$, each of which is provided with a handle or half-handle $d^1$, $d^2$ so that when the case is closed the two parts come together and the hand of the person carrying the package passes through both sections $e^1$, $e^2$ of the handle, thus ensuring perfect security against accidental opening whilst carrying. Also the weight is evenly distributed and suspended from the two parts of the handle.

The case E is made light-tight and entirely encloses the camera or projector and the film is preferably formed with a light-proof leader at each end as described in my prior Patent No. 1,655,297 dated January 3, 1928, to form light-tight wrappers to each spool so that the camera can be loaded in daylight with fresh films by inserting fresh film spools and then threading up in the usual way.

When the camera or projector is to be used the two parts $E^1$, $E^2$ of the case are opened flat and are retained in that position by slotted struts $e^3$ which each lock at the fully open position by means of a stud $e^4$ which engages in a notch in the strut, being pushed in by pressure of a spring $e^5$. These two parts $E^1$, $E^2$ of the case are hinged at $b$ to the narrow main framework B of the mechanism, and owing to their area give to the apparatus a rigid flat base of very considerable width to rest upon a table, tripod, or other support, so that the apparatus will have a degree of steadiness which the narrow main framework B would not give.

Figure 6:
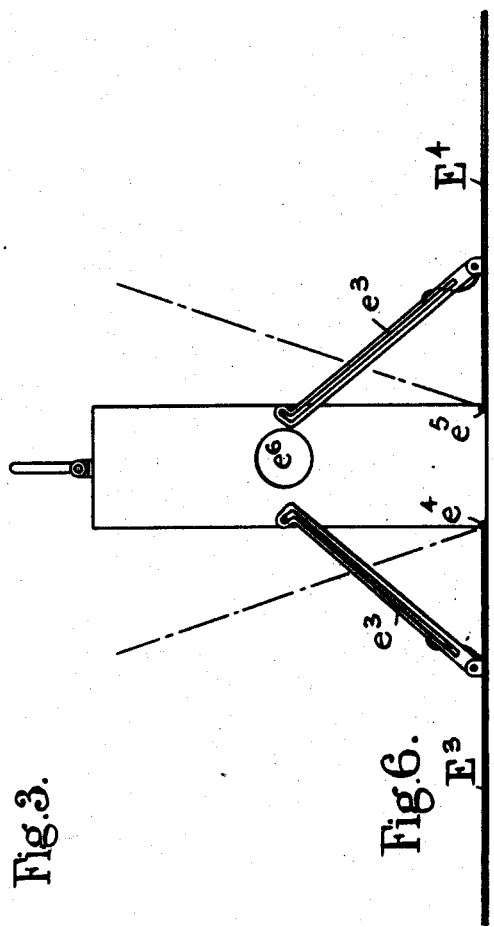
Fig. 6 is a front view of a projector such as shown in Fig. 3 with a modified form of case the sides of which are open to form a large flat base.

In a modified arrangement as shown in Fig. 6 the central part of the case B may comprise a frame or box the same width as the apparatus. The sides $E^3$, $E^4$ of this box are hinged to the box at the bottom at $e^4$ and $e^5$ and are folded outward and flat when the case is open, being retained in that position by the spring struts $e^3$ as described with reference to Figs. 4 and 5. In this arrangement an opening $e^6$ is left for the lens at the front end of the frame of the case and the apparatus can therefore be used closed in the band without folding the sides outward.

But in the first (and preferred) arrangement the case entirely encloses and protects the lens when closed.

In either form the case E may be leather covered or otherwise finished in any convenient manner.

What I claim as my invention and desire to protect by Letters Patent is:—

A cinematograph camera comprising a casing, a film supply spool rotatably mounted within the casing, a film receiving reel rotatably mounted in front of and in line with the supply spool, a lens mounted in an aperture in one end of the casing in front of the receiving reel, mechanism for feeding the film past the lens, a sprocket over which the film passes on its way from the spool to the exposure aperture and a second sprocket round which the film passes on its way from the exposure aperture to the reel, both sprockets being mounted between the spool and reel the arrangement being such that the film describes a track lying wholly in a plane the width of the film, a two part container within which the casing is housed, a chamber at one end of the container to enclose and protect the lens when not in use, a hinge connecting the two parts together at one end, spring operated struts to retain the container rigid as a flat base when open, and a handle on each of the two halves for transport purposes.

In testimony whereof I have hereunto set my hand.

JOHN EDWARD THORNTON.